N. RICHARDSON.
BAIT-CUTTING MACHINE.
No. 172,777. Patented Jan. 25, 1876.
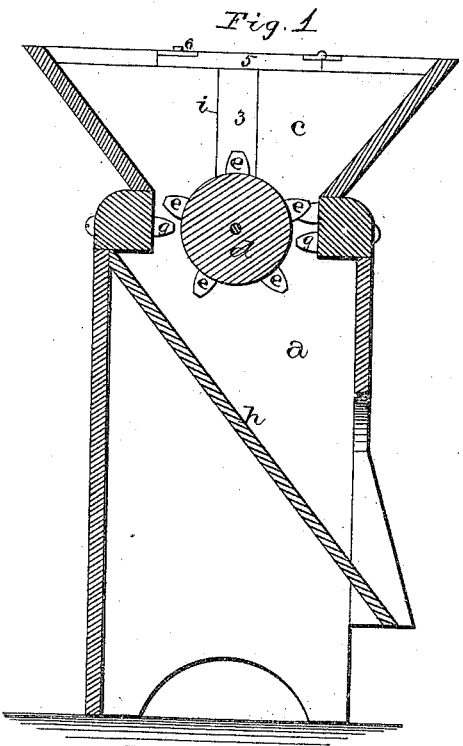
Fig. 1
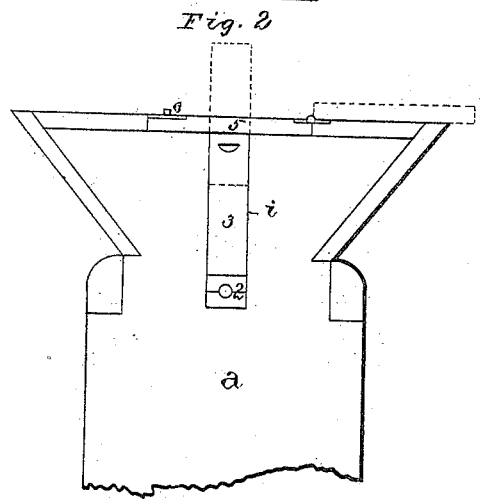
Fig. 2
Fig. 3
WITNESSES.
J. Wm. Garner
Frank N. Burnham.
INVENTOR.
N. Richardson
per
F. A. Lehmann Atty

UNITED STATES PATENT OFFICE.

NATHAN RICHARDSON, OF GLOUCESTER, MASSACHUSETTS, ASSIGNOR TO A. VOSS, OF SAME PLACE.

IMPROVEMENT IN BAIT-CUTTING MACHINES.

Specification forming part of Letters Patent No. 172,777, dated January 25, 1876; application filed December 21, 1875.

*To all whom it may concern:*

Be it known that I, NATHAN RICHARDSON, of Gloucester, in the county of Essex and State of Massachusetts, have invented certain new and useful Improvements in Bait-Cutting Machine; and I do hereby declare the following to be a full, clear, and exact description of the invention, such as will enable others skilled in the art to which it pertains to make and use it, reference being had to the accompanying drawings, which form part of this specification.

My invention relates to an improvement in bait-cutting machines; and it consists in the arrangement and combination of parts, that will be more fully described hereinafter, whereby the roller can be readily removed from the frame.

The accompanying drawings represent my invention. $a$ represents a frame of any suitable construction, having the hopper $c$ formed in its upper end. The roller $d$, armed with suitable cutting-teeth $e$, revolves at the bottom of this hopper between the two sets of teeth $g$, secured in the frame, and the bait, as cut, falls upon the inclined board $h$, and runs into any receptacle prepared for it.

Cut in opposite sides of the frame are the vertical slots $i$, down in the bottoms of which are placed the metal boxes 2, in which the pivots of the roller have their bearings. Forced down into these slots, so as to bear down upon the tops of the boxes, are the tongues 3, the sides of the slots and the edges of the tongues being so formed that the tongues can only be removed from the slots by drawing them vertically upward.

In order to hold the tongues down in position, there are hinged to the top edges of the hopper the two stops 5, through one end of which are cut slots, up through which pass the buttons 6 for locking the stops down in position.

By means of the above described devices the roller can be quickly removed whenever the knives become dull, the knife sharpened, and the roller readily replaced.

The two end boards of the hopper are made vertical, while the sides are made inclined, thereby causing the bait to fall upon the knives, and preventing it from getting out of the way as they begin to revolve.

Having thus described my invention, I claim—

The combination of the frame $a$, having the vertical slots in its sides, the tongues 3, stops 5, and clasps or holding devices 6, whereby the roller $d$ is made removable from the frame, substantially as shown and described.

In testimony that I claim the foregoing, I have hereunto set my hand this 17th day of December, 1875.

NATHAN RICHARDSON.

Witnesses:
GEORGE LANE,
EDWIN CRESSY.